(12) United States Patent
Nagashima (10) Patent No.: US 7,719,949 B2
(45) Date of Patent: May 18, 2010

(54) OPTICAL HEAD

(75) Inventor: Kenji Nagashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 724 days.

(21) Appl. No.: 11/656,972

(22) Filed: Jan. 24, 2007

(65) Prior Publication Data

US 2007/0177485 A1     Aug. 2, 2007

(30) Foreign Application Priority Data

Jan. 27, 2006    (JP)    .............. 2006-018914

(51) Int. Cl.
*G11B 7/00*    (2006.01)
(52) U.S. Cl. .............. 369/112.1; 369/112.05; 369/120; 369/112.24; 369/44.37
(58) Field of Classification Search .............. None
See application file for complete search history.

(56) References Cited

U.S. PATENT DOCUMENTS

| | | | |
|---|---|---|---|
| 5,737,296 A * | 4/1998 | Komma et al. .......... | 369/44.23 |
| 6,442,125 B1 * | 8/2002 | Maeda et al. .......... | 369/112.1 |
| 7,009,919 B2 * | 3/2006 | Matsuda .......... | 369/44.41 |

FOREIGN PATENT DOCUMENTS

| | | |
|---|---|---|
| DE | 698 08 883 T2 | 8/2003 |
| DE | 697 22 951 T2 | 5/2004 |
| DE | 699 23 405 T2 | 6/2005 |
| DE | 60 2004 007 388 T2 | 4/2008 |
| EP | 1 605 499 B1 | 6/2005 |
| EP | 1 617 424 A1 | 1/2006 |
| JP | A-2001-222838 | 8/2001 |
| JP | A-2003-223728 | 8/2003 |
| JP | 2004-219750 A | 8/2004 |
| JP | 2004-327005 A | 11/2004 |

* cited by examiner

*Primary Examiner*—Joseph H Feild
*Assistant Examiner*—Joseph Haley
(74) *Attorney, Agent, or Firm*—Morgan Lewis & Bockius LLP (57) ABSTRACT

An optical head includes a blue color laser beam sources, a red color laser beam sources, a dichroic prism, a collimator lens, a beam splitter, an objective lens, a photo detector element, a detection lens, and a hologram element having a first hologram and a second hologram and the first hologram changes a phase of a +1st order diffraction light of a blue color laser beam so that its condensing point falls on a second photo detecting portion and the second hologram changes a phase of a −1st order diffraction light of a red color laser beam so that its condensing point falls on a third photo detecting portion.

4 Claims, 5 Drawing Sheets

OPTICAL HEAD

This application is based on Japanese Patent Application No. 2006-018914 filed on Jan. 27, 2006, the contents of which are hereby incorporated by reference.

BACKGROUND OF THE INVENTION

1. Field of the Invention

The present invention relates to an optical head that is provided to an optical disc device for recording information on an optical disc or reading information from an optical disc, and the optical head being capable of obtaining an appropriate signal by projecting a laser beam to the optical disc.

2. Description of Related Art

Optical discs that can reproduce information when a laser beam is projected are used as recording media for storing information such as pictures and sounds. As such optical discs, a DVD (Digital Versatile Disc) is used, and a BD (Blu-ray Disc) having higher density (more storing capacity) than a DVD becomes available in the market recently. The optical disc device that uses these optical discs as a recording medium reproduces information recorded on the optical disc by rotating the optical disc and by projecting a laser beam to a recording surface of the optical disc.

Usually, a single optical head supports reproduction of information from a DVD and a BD for saving space and cost of the optical disc device. In addition, since laser beams corresponding to a DVD and a BD have different wavelengths, the optical head has laser beam sources that can emit laser beams having corresponding wavelengths. The optical head is provided with an objective lens facing the optical disc, and the laser beam that was emitted from the laser beam sources and passed through an optical system of the optical head is condensed on a recording layer of the optical disc after passing through the objective lens.

When the laser beam passes through the objective lens, aberration is generated in the laser beam. In addition, since the optical disc has a structure including a substrate that is a protection layer disposed on the recording layer, another aberration is generated when the laser beam passes through the substrate. Usually, the objective lens is designed to support one type of optical disc (a BD in many cases), so the aberration generated in the laser beam after passing through the objective lens is canceled with aberration generated by the substrate of the BD. Thus, the laser beam becomes with little wave aberration when it is condensed on the recording layer.

Figure 6:
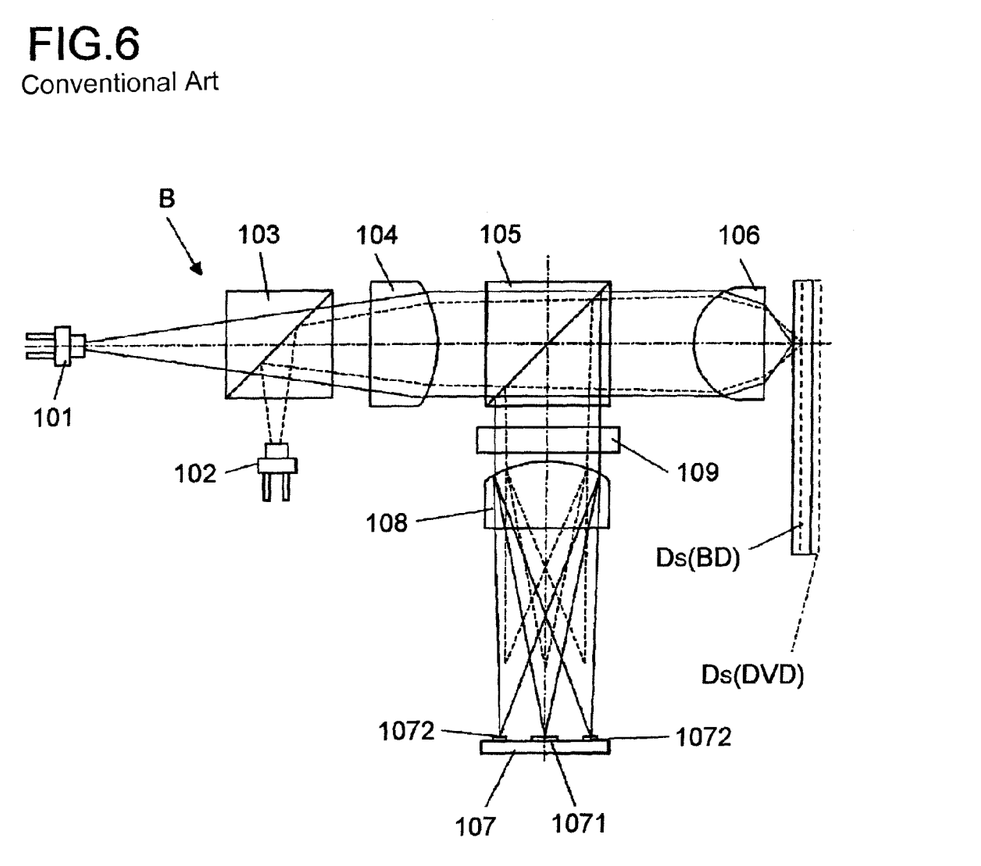
FIG. 6 shows a schematic diagram of a conventional optical head.

FIG. 6 is a schematic diagram of an optical head. The optical head B shown in FIG. 6 includes a blue color laser beam sources 101 that emits a blue color laser beam, a red color laser beam sources 102 that emits a red color laser beam, a dichroic prism 103 that permits the blue color laser beam to pass through and reflects the red color laser beam, a collimator lens 104 that converts divergent rays into parallel rays, a beam splitter 105 as an optical element that reflects a part of an incident laser beam and permits the rest of the same to pass through, an objective lens 106 that condenses the laser beam at a predetermined position on an optical disc Ds, a photo detector element 107 that detects the laser beam reflected by the optical disc Ds, and a detection lens 108 that condenses the laser beam on the photo detector element 107.

The laser beam emitted from the blue color laser beam sources 101 passes through the dichroic prism 103, enters the collimator lens 104, and is converted into parallel rays when it passes through the collimator lens 104. The laser beam converted into parallel rays enters the beam splitter 105, and a half of the incident light passes through the beam splitter 105 and enters the objective lens 106. The laser beam that enters the objective lens 106 is condensed to be a laser spot that is projected to the optical disc Ds.

In addition, the laser beam reflected by the optical disc Ds goes back to the objective lens 106 and becomes substantially parallel rays, which enters the beam splitter 105. A half of the laser beam that enters the beam splitter 105 is reflected and enters the detection lens 108. Then, it is condensed and enters the photo detector element 107. The laser beam is converted by the photo detector element 107 into an electric signal, and information recorded on the optical disc is detected in accordance with the converted electric signal.

In addition, the optical head B is provided with a diffraction grating 109 that separates the 0 order diffraction light and 1st order diffraction light from the laser beam reflected by the optical disc Ds. The photo detector element 107 has a first photo detecting portion 1071 in the middle and two second photo detecting portion 1072 sandwiching the first photo detecting portion 1071. The 0 order diffraction light of the light diffracted by the diffraction grating 109 is detected by the first photo detecting portion 1071, while the 1st order diffraction light is detected by the second photo detecting portion 1072. The first photo detecting portion 1071 detects an RF signal that is a data signal and a focus error signal. The second photo detecting portion 1072 detects a control signal (e.g., a tracking error signal) for drive control of the optical head B.

However, thickness of a disc substrate, wavelength of a corresponding laser beam, and a numerical aperture NA of the objective lens for a DVD medium are different from those for a BD. Therefore, if an objective lens for a BD is used for condensing the laser beam on the recording layer of a DVD, wave aberration with a large aberration component is generated in the laser beam that is projected to the recording layer of the DVD medium.

If wave aberration with a large aberration component is generated, a condensing point of the laser beam that is condensed on the recording surface of the optical disc (hereinafter referred to as a laser spot) may have a large spot diameter, or a dim circular light (a halo) may be formed around the laser spot. As a result, cross talk or jitter may be increased, and accuracy in reproducing information from the optical disc or recording information on the optical disc may be lowered.

In order to suppress generation of this wave aberration, the following method is adopted in the optical head shown in FIG. 6. A distance between the red color laser beam sources 102 and the collimator lens 104 (including a portion bent by the dichroic prism 103) is adjusted (usually, it is shorter than a distance between the blue color laser beam sources 101 and the collimator lens 104), so that the red color laser beam sources 102 is disposed at a position of a distance that makes the red color laser beam be not parallel rays. A condensing point of the red color laser beam condensed by the objective lens 106 is shifted from a condensing point of the blue color laser beam (the condensing point of the red color laser beam is farther). In this way, since the blue color laser beam sources 101 and the red color laser beam sources 102 are arranged so that their condensing points are shifted from each other, generation of aberration in the laser beam that is condensed on the optical disc Ds is suppressed.

In addition, JP-A-2003-223728 discloses a structure in which a single optical pickup is used for reading optical discs having different substrate thickness, corresponding wavelengths and numerical apertures, and an objective lens having a special shape is provided.

Moreover, JP-A-2001-222838 discloses an invention in which aberration of a laser beam projected to each optical disc is corrected by using a liquid crystal element.

However, since there is a difference between distances of the blue color laser beam sources 101 and the red color laser beam sources 102 from the collimator lens 104 (hereinafter referred to as a light emission point difference), the condensing point where the light beam is condensed by the detection lens 108 is also different between the blue color laser beam and the red color laser beam. More specifically, as shown in FIG. 6, the condensing point of the blue color laser beam is farther than the condensing point of the red color laser beam from the detection lens.

For example, if the first photo detecting portion 1071 of the photo detector element 107 is disposed at the condensing point of the blue color laser beam, the 0 order diffraction light of the blue color laser beam is detected by the first photo detecting portion 1071, and the 1st order diffraction light of the same is detected by the second photo detecting portion 1072. However, the 0 order diffraction light of the red color laser beam becomes dim so that it is not condensed by the first photo detecting portion 1071 and is not detected with sufficient accuracy. In the same manner, the 1st order diffraction light of the red color laser beam is not condensed by the second photo detecting portion 1072 and becomes dim so that it is not detected with sufficient accuracy.

In this way, if the 0 order diffraction light and the 1st order diffraction light projected to the first photo detecting portion 1071 and the second photo detecting portion 1072 are not detected sufficiently, the optical disc Ds cannot be read with sufficient accuracy, and accuracy in drive control of the optical head B is decreased.

In addition, since the invention disclosed in JP-A-2003-223728 uses the objective lens having the special shape, a lot of labor and time are necessary for manufacturing the objective lens having a special shape. As a result, manufacturing cost of the optical pickup (an optical head) increases.

In addition, since the invention disclosed in JP-A-2001-222838 uses the liquid crystal element for correcting the aberration, the liquid crystal element and other components for a drive mechanism that drives the liquid crystal element should be added. Therefore, dimensions and cost of the optical head may be increased.

SUMMARY OF THE INVENTION

In view of above described problem, it is an object of the present invention to provide an optical head that can obtain a sufficient control signal that is necessary for a drive control of the optical head, can perform an accurate control, and has high reliability without adding a complicated member and an additional optical element.

Another object of the present invention is to provide an optical head that is capable of reading optical discs having two different thickness of a substrate by a single objective lens and a single photo detector element without adding a complicated member and an additional optical element.

An optical head according to one aspect of the present invention includes a first laser beam source for emitting a first laser beam that supports a first optical disc, a second laser beam sources for emitting a second laser beam that supports a second optical disc, an objective lens for condensing the first or the second laser beam on a recording surface of the first or the second optical disc, a diffraction optical element for permitting the first or the second laser beam reflected by the first optical disc or the second optical disc to pass through and for separating 0 order diffraction light and 1st order diffraction light independently, a detection lens for condensing the 0 order diffraction light of the first or the second laser beam on an optical axis and for condensing the 1st order diffraction light of the first or the second laser beam at a symmetric position with respect to the condensing point of the 0 order diffraction light of the first or the second laser beam, and a photo detector element including a first photo detecting portion for detecting the 0 order diffraction light of the first or the second laser beam that passed through the detection lens and two second photo detecting portions arranged symmetrically with respect to the first photo detecting portion for detecting the 1st order diffraction light of the first or the second laser beam, the first photo detecting portion and the two second photo detecting portions being arranged on the same plane. The photo detector element is arranged so that the first photo detecting portion is located between the condensing point of the 0 order diffraction light of the first laser beam and the condensing point of the 0 order diffraction light of the second laser beam that is condensed at a position closer to the detection lens than the condensing point of the first laser beam and that the optical axis of the 0 order diffraction light becomes perpendicular to the first photo detecting portion. The diffraction optical element changes a phase of the 1st order diffraction light of the first or the second laser beam so that the 1st order diffraction light that is condensed at a position closer to the detection lens of the first laser beam is condensed on one of the second photo detecting portions of the photo detector element and that the 1st order diffraction light that is condensed at a position farther from the detection lens of the second laser beam is condensed on the other of the second photo detecting portions.

According to this structure, the 0 order diffraction light that is a beam for a data signal of the first laser beam and the second laser beam can be projected to be a spot having the same size and the same shape as the first photo detecting portion. Therefore, reading of data can be performed accurately.

In addition, since one of the second photo detecting portions detects the 1st order diffraction light of the first laser beam while the other of the second photo detecting portions detects the 1st order diffraction light of the second laser beam. Therefore, a control of the optical head can be performed accurately.

According to this structure, a position of the photo detector element is shifted, and shapes of the first hologram and the second hologram of the hologram element are optimized. Thus, reading of an optical disc having a plurality of substrate thickness can be performed by using a single objective lens and a single photo detector element without using any additional optical element.

Thus, structural members of the optical head can be reduced so that a size and manufacturing cost of the optical head can be reduced. In addition, since the number of the optical elements through which the laser beam passes can be reduced, an energy loss and aberration of the laser beam when the laser beam passes through the optical elements can be reduced.

Preferably in the structure described above, the diffraction optical element includes a first hologram formed on one surface for separating the first laser beam and a second hologram formed on the other surface for separating the second laser beam, and the first or the second hologram separates the first or the second laser beam independently. In another preferable embodiment, the diffraction optical element includes the first hologram for separating the 0 order diffraction light and the 1st order diffraction light from the first laser beam and the second hologram for separating the 0 order diffraction light and the 1st order diffraction light from the second laser beam, the first and the second holograms being arranged on the surface in a regular manner, respectively.

An optical head according to another aspect of the present invention includes a first laser beam source for emitting a first laser beam that has a shorter wavelength corresponding to a first optical disc having a smaller thickness of a disc substrate, a second laser beam sources for emitting a second laser beam that has a longer wavelength corresponding to a second optical disc having a larger thickness of the disc substrate, a collimator lens that converts the first laser beam into parallel rays and converts the second laser beam into light having a small angle of divergence, an objective lens for condensing the first or the second laser beam on a recording surface of the first or the second optical disc, a hologram element including a first hologram formed on one surface for separating the 0 order diffraction light and the ±1st order diffraction light from only the first laser beam reflected by the first optical disc and a second hologram formed on the other surface for separating the 0 order diffraction light and the ±1st order diffraction light from only the second laser beam reflected by the second optical disc, a detection lens for condensing the 0 order diffraction light of the first or the second laser beam on an optical axis and for condensing the ±1st order diffraction light of the first or the second laser beam at a symmetric position with respect to the condensing point of the 0 order diffraction light of the first or the second laser beam and the optical axis of the 0 order diffraction light, and a photo detector element including a first photo detecting portion for detecting the 0 order diffraction light of the first or the second laser beam that passed through the detection lens and two second photo detecting portions arranged symmetrically with respect to the first photo detecting portion for detecting the ±1st order diffraction light of the first or the second laser beam, the first photo detecting portion and the two second photo detecting portions being arranged on the same plane. The photo detector element is arranged so that the first photo detecting portion is located between the condensing point of the 0 order diffraction light of the first laser beam and the condensing point of the 0 order diffraction light of the second laser beam that is condensed at a position closer to the detection lens than the condensing point of the first laser beam and that the optical axis of the 0 order diffraction light becomes perpendicular to the first photo detecting portion. The first hologram of the hologram element changes a phase of the ±1st order diffraction light of the first laser beam so that the +1st order diffraction light that is condensed at a position closer to the detection lens is condensed on one of the second photo detecting portions of the photo detector element, and the second hologram changes a phase of the ±1st order diffraction light of the second laser beam so that the −1st order diffraction light that is condensed at a position farther from the detection lens of the second laser beam is condensed on the other of the second photo detecting portions of the photo detector element.

According to this structure, the 0 order diffraction light that is a beam for a data signal of the first laser beam and the second laser beam can be projected to be a spot having the same size and the same shape as the first photo detecting portion. Therefore, reading of data can be performed accurately.

In addition, since one of the second photo detecting portions detects the −1st order diffraction light of the first laser beam while the other of the second photo detecting portions detects the +1st order diffraction light of the second laser beam. Therefore, a control of the optical head can be performed accurately.

According to this structure, a position of the photo detector element is shifted, and shapes of the first hologram and the second hologram of the hologram element are optimized. Thus, reading of an optical disc having a plurality of substrate thickness can be performed by using a single objective lens and a single photo detector element without using any additional optical element.

Thus, structural members of the optical head can be reduced so that a size and manufacturing cost of the optical head can be reduced. In addition, since the number of the optical elements through which the laser beam passes can be reduced, an energy loss and aberration of the laser beam when the laser beam passes through the optical elements can be reduced.

According to the present invention, it is possible to provide an optical head that can obtain a sufficient control signal that is necessary for a drive control of the optical head, can perform an accurate control, and has high reliability without adding a complicated member and an additional optical element.

Further, according to the present invention, it is possible to provide an optical head that is capable of reading optical discs having two different thickness of a substrate by a single objective lens and a single photo detector element without a complicated member and an additional optical element.

DESCRIPTION OF THE PREFERRED EMBODIMENTS

Figure 1:
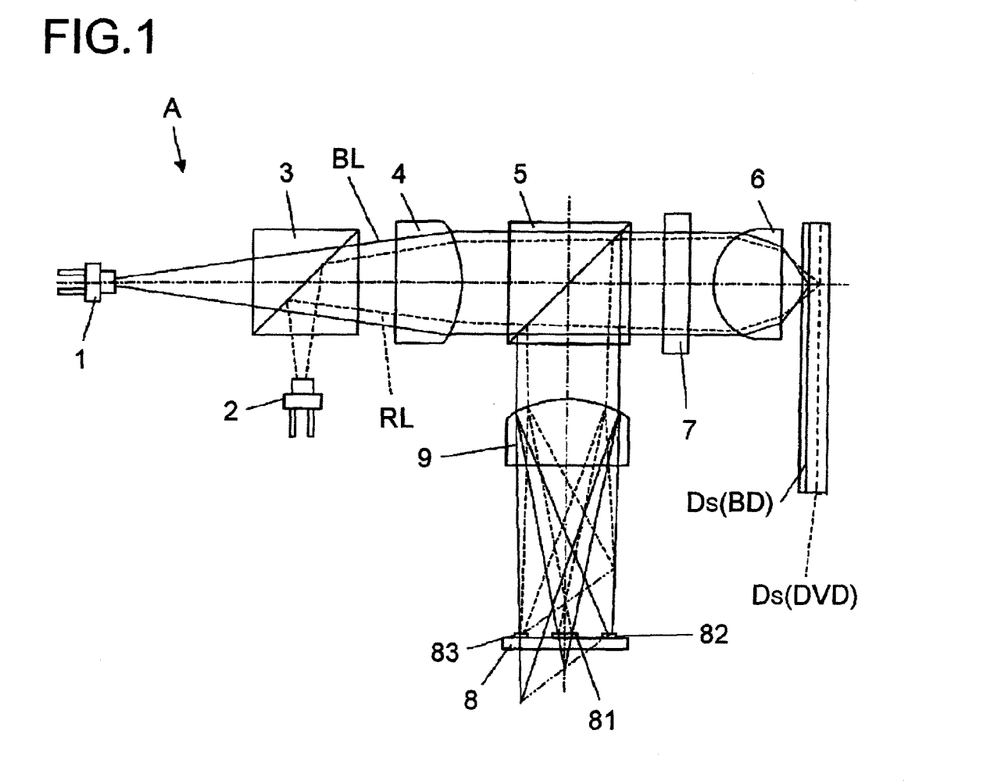
FIG. 1 is a schematic diagram of an optical head according to the present invention.

Now, an embodiment of the present invention will be described with reference to the attached drawings. FIG. 1 shows a schematic diagram of an optical head according to the present invention. An optical head A shown in FIG. 1 can read a BD and a DVD, but it does not mean limitation. In FIG. 1, a blue color laser beam BL is shown by a solid line, and a red color laser beam RL is shown by a broken line.

The optical head A includes a blue color laser beam sources 1 that emits a blue color laser beam BL having a shorter wavelength, a red color laser beam sources 2 that emits a red color laser beam RL having a longer wavelength, a dichroic prism 3 that permits the blue color laser beam BL to pass through and reflects the red color laser beam RL, a collimator lens 4 that converts divergent rays into parallel rays, a beam splitter 5 as an optical element that reflects a part of an incident laser beam and permits the rest of the same to pass through, an objective lens 6 that condenses the laser beam at a predetermined position on an optical disc Ds, a hologram element 7 that separates 0 order diffraction light and ±1st order diffraction light from the laser beam reflected by the optical disc Ds, a photo detector element 8 that detects the laser beam reflected by the optical disc Ds, and a detection lens 9 that condenses the laser beam on the photo detector element 8.

The objective lens 6 is formed to be adapted to the blue color laser beam BL so that aberration is not generated when the blue color laser beam BL is projected to the substrate of the optical disc Ds (BD). A distance between the blue color laser beam sources 1 and the collimator lens 4 has a sufficient length necessary for the collimator lens 4 to convert the blue color laser beam BL that is divergent rays emitted from the blue color laser beam sources 1 into parallel rays. In addition, when the red color laser beam RL is projected, the objective lens 6 may generate a lot of aberration. In order to suppress the aberration, the red color laser beam sources 2 is arranged so that there is a difference between a distance from the red color laser beam sources 2 to collimator lens 4 and a distance from the blue color laser beam sources 1 to the collimator lens 4 (referred to as a light emission point difference). Thus, the red color laser beam RL that is divergent rays emitted from the red color laser beam sources 2 is made to have a smaller angle of divergence by the collimator lens 4 but is not converted into parallel rays.

A forward light path of the blue color laser beam BL is as follows. The blue color laser beam BL emitted from the blue color laser beam sources 1 passes through the dichroic prism 3 and enters the collimator lens 4. The blue color laser beam BL is converted into parallel rays when it passes through the collimator lens 4. The laser beam converted into parallel rays enters the beam splitter 5, and a half of the incident light passes through the beam splitter 5 and enters the objective lens 6. The blue color laser beam BL that enters the objective lens 6 is condensed and projected onto the optical disc (BD).

In addition, a forward light path of the red color laser beam RL is as follows. The red color laser beam RL emitted from the red color laser beam sources 2 is reflected by the dichroic prism 3 to bend and enter the collimator lens 4. The red color laser beam RL that enters the collimator lens 4 is converted into light having smaller angle of divergence. The red color laser beam RL that goes out from the collimator lens 4 enters the beam splitter 5, and a half of the incident light passes through the beam splitter 5 and enters the objective lens 6. The red color laser beam RL that enters the objective lens 6 is condensed and projected onto the optical disc (DVD).

Although the hologram element 7 is disposed between the beam splitter 5 and the objective lens 6 as shown in FIG. 1, the ±1st order diffraction light in the forward light path departs from an optical path (the backward light path) of the laser beam after being reflected by the optical disc (BD or DVD), so it can be ignored.

Figure 2:
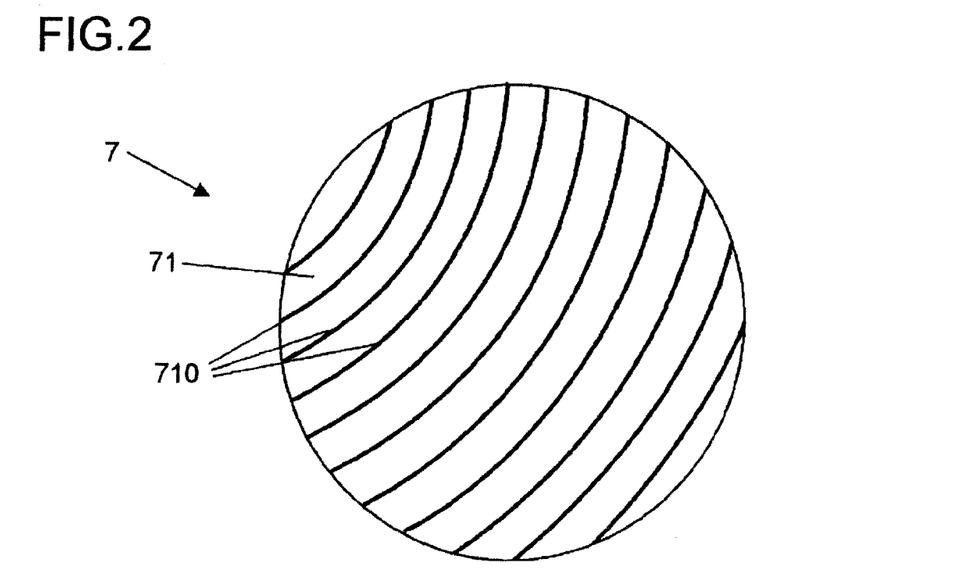
FIG. 2 is a schematic plan view of a hologram element provided to an optical head according to the present invention.
Figure 3:
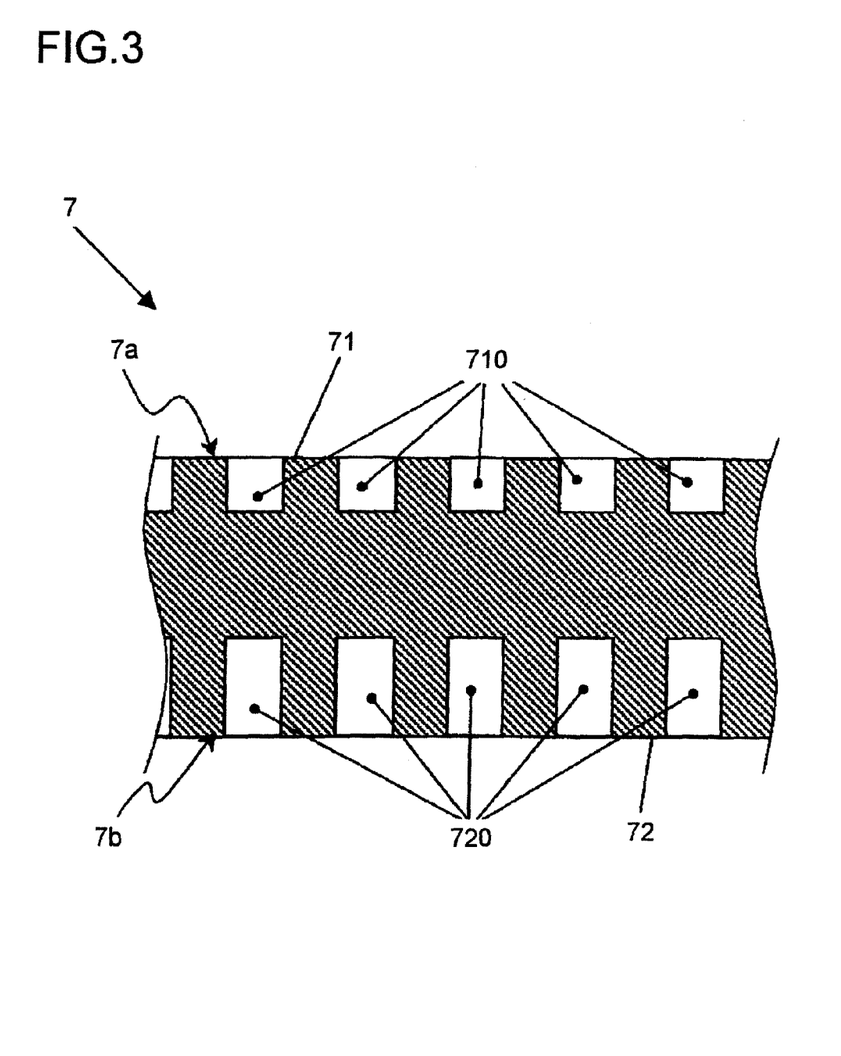
FIG. 3 is a schematic diagram to show a cross section of the hologram element shown in FIG. 2.

FIG. 2 shows a schematic plan view of a hologram element provided to an optical head according to the present invention. FIG. 3 is a schematic diagram to show a cross section of the hologram element shown in FIG. 2. The hologram element 7 shown in FIGS. 2 and 3, which are mere schematic diagrams, and the hologram element may have a shape different from that of a hologram element that is really used. The hologram element 7 shown in FIG. 2 has a disk like shape. As described later, the hologram element 7 is equipped with a first hologram 71 for diffracting the blue color laser beam BL and a second hologram 72 for diffracting the red color laser beam RL. The hologram element 7 shown in FIG. 2 shows the first hologram 71 corresponding to the blue color laser beam BL but it should not be understood as limitation. The hologram element 7 is provided with a plurality of curved grooves 710 on its surface. Since the curved grooves 710 are formed, a phase of the ±1st order diffraction light can be changed.

Furthermore as shown in FIG. 3, the hologram element 7 is provided with the first hologram 71 (see FIG. 2) formed on a first surface 7a and the second hologram 72 formed on a second surface 7b that is opposite to the first surface 7a. The first hologram 71 can separate the 0 order diffraction light and the ±1st order diffraction light only from the blue color laser beam BL. The second hologram 72 can separate the 0 order diffraction light and the ±1st order diffraction light only from the red color laser beam RL. Each of the first hologram 71 and the second hologram 72 is provided with a plurality of curved grooves 720 in the same manner as those shown in FIG. 2.

As shown in FIG. 3, the recessed grooves 710 of the first hologram 71 and the recessed grooves 720 of the second hologram 72 have different depths of the grooves from each other. Each of the depth of the grooves corresponds to the wavelength of each of the blue color laser beam BL and the red color laser beam RL, so only the corresponding laser beam can be diffracted.

The blue color laser beam BL reflected by the optical disc enters the objective lens 6 to be substantially parallel rays, and then enters the hologram element 7. The laser beam that enters the hologram element 7 is separated into 0 order diffraction light and ±1st order diffraction light. The hologram element 7 includes the first hologram 71 that is formed so that phases of +1st order diffraction light and −1st order diffraction light of the blue color laser beam BL are different from each other.

In addition, the red color laser beam RL reflected by the optical disc enters the objective lens 6 to be convergent rays that is converging slightly, and then enters the hologram element 7. The laser beam that enters the hologram element 7 is separated into 0 order diffraction light and ±1st order diffraction light. The hologram element 7 includes the second hologram 72 that is formed so that phases of +1st order diffraction light and −1st order diffraction light of the red color laser beam RL are different from each other.

Figure 4:
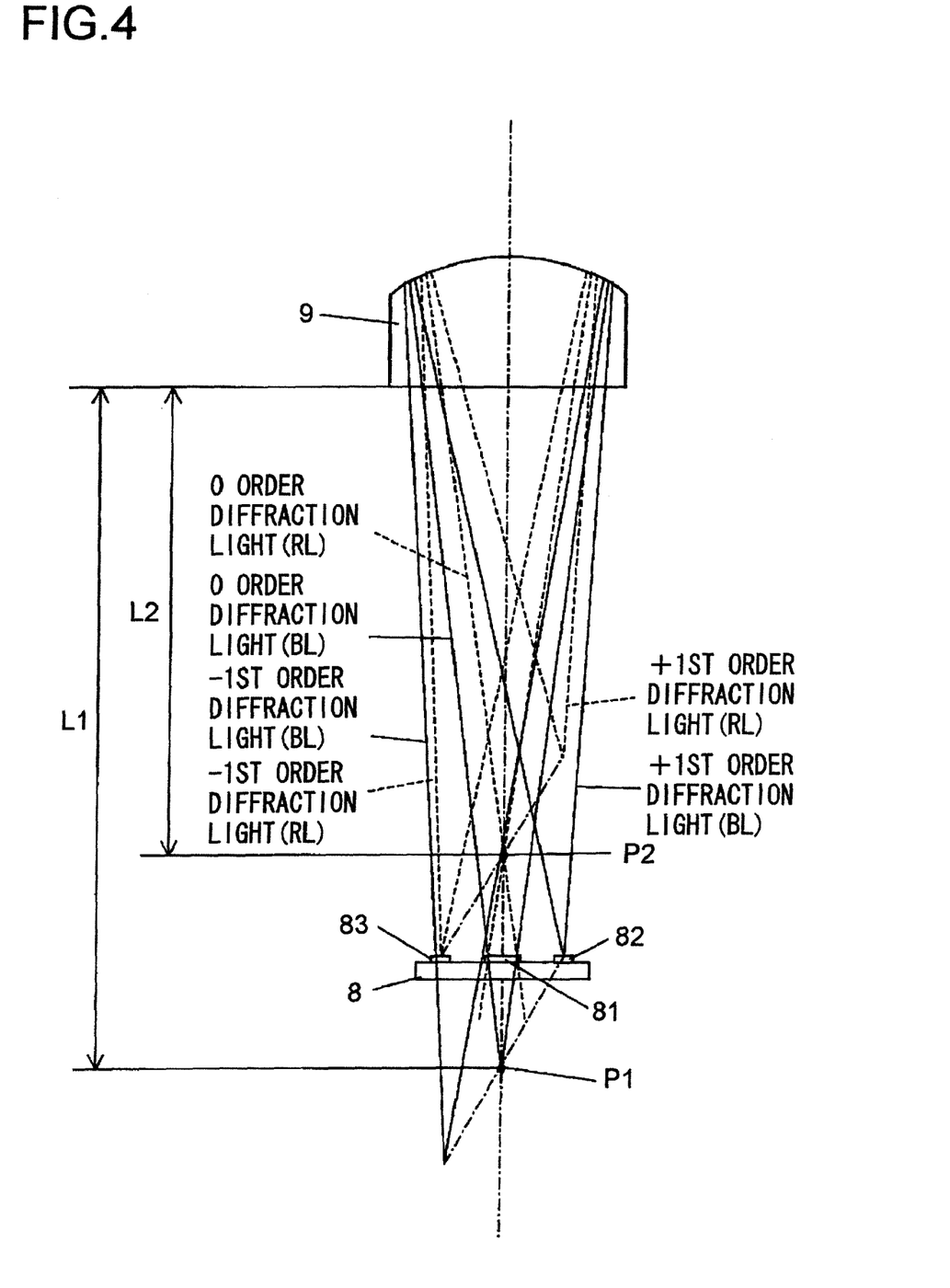
FIG. 4 shows a diagram of condensing points of 0 order diffraction light and ±1st order diffraction light when they are condensed by the detection lens for the blue color laser beam BL and the red color laser beam RL.

FIG. 4 shows a diagram of condensing points of 0 order diffraction light and ±1st order diffraction light when they are condensed by the detection lens for the blue color laser beam BL and the red color laser beam RL. The blue color laser beam BL separated into the 0 order diffraction light and the ±1st order diffraction light is reflected by the beam splitter 5 and is condensed by the detection lens 9. In this case, the 0 order diffraction light is condensed at a position (a first condensing point Pl) that is away from the detection lens 9 by a distance L1. In addition, the +1st order diffraction light and the −1st order diffraction light are formed at symmetric positions with respect to the first condensing point P1 shifted in the optical axis of the 0 order diffraction light as shown in FIG. 4. This is generated because the +1st order diffraction light and the −1st order diffraction light change their phases and are condensed by the detection lens 9 when the first hologram 71 separates the ±1st order diffraction light. The condensing point of the −1st order diffraction light is farther from the detection lens 9 but it should not be understood as limitation.

In addition, the red color laser beam RL that is separated into the 0 order diffraction light and the ±1st order diffraction light by the second hologram 72 is reflected by the beam splitter 5, enters the detection lens 9 and are condensed by the same in the same manner. In this case, due to the light emission point difference, the red color laser beam RL is condensed at a position (a second condensing point P2) far from the detection lens 9 by a distance L2 that is shorter than the first condensing point P1. In addition, also as to the ±1st order diffraction light, similarly to the case of the blue color laser beam BL, it is formed at a symmetric position with respect to the second condensing point P2 so as to be shifted in the optical axis direction of the 0 order diffraction light. The condensing point of the −1st order diffraction light is farther from the detection lens 9 but it should not be understood as limitation.

As shown in FIG. 4, the photo detector element 8 has the same shape as the conventional photo detector element 8 and includes a first photo detecting portion 81 for detecting the 0 order diffraction light, a second photo detecting portion 82 for detecting the ±1st order diffraction light and a third photo detecting portion 83. The second photo detecting portion 82 and the third photo detecting portion 83 is formed in a symmetric manner with respect to the first photo detecting portion 81, and the first photo detecting portion 81 is disposed so as to be perpendicular to the optical axis of the 0 order diffraction light. Since the first photo detecting portion 81 of the photo detector element 8 is disposed between the first condensing point P1 and the second condensing point P2, the 0 order diffraction light of the blue color laser beam BL and the 0 order diffraction light of the red color laser beam RL have beam spots that are substantially the same size and the same shape as each other for being projected to the first photo detecting portion 81.

In this case, the hologram element 7 includes a first hologram 71 and a second hologram 72. The first hologram 71 has a shape so as to change the phase of the ±1st order diffraction light so that the condensing point of the +1st order diffraction light condensed on the side closer to the detection lens 9 of the blue color laser beam BL is overlapped on the second photo detecting portion 82. The second hologram 72 has a shape so as to change the phase of the ±1st order diffraction light so that the condensing point of the −1st order diffraction light condensed on the side farther from the detection lens 9 of the red color laser beam RL is overlapped on the third photo detecting portion 83.

Since the hologram element 7 is provided, the 0 order diffraction light that is a laser beam for data signals of the blue color laser beam BL and the red color laser beam RL can be detected, and the 1st order diffraction light that is a laser beam for a drive control can be detected.

In addition, since the hologram element 7 is provided and the position of the photo detector element 8 is adjusted, the data signals of the blue color laser beam BL and the red color laser beam RL and the control signal can be detected by using the single photo detector element 8 without forming the photo detector element 8 to have a special shape or adding a special optical element.

Thus, without increasing structural members of the optical head A or using a complicated optical element, the optical discs (e.g., a BD and a DVD) having different substrate thickness can be read by using the single objective lens 6 and the single photo detector element 8. As a result, an increase of the manufacturing cost of the optical head A can be avoided, and flexibility in designing the optical head A can be increased.

In the example described above, the hologram element 7 that is used for the optical head A of the present invention changes the phases of the ±1st order diffraction light of the blue color laser beam BL and the red color laser beam RL by the first hologram 71 and the second hologram 72. Therefore, in either of the laser beams, the −1st order diffraction light is condensed at the position farther than the +1st order diffraction light. However, the present invention is not limited to this structure. It is possible to adopt widely the hologram element in which the +1st order diffraction light and the −1st order diffraction light are condensed in a symmetric manner with respect to the condensing point of the 0 order diffraction light to as to be shifted from in the axial direction.

Figure 5:
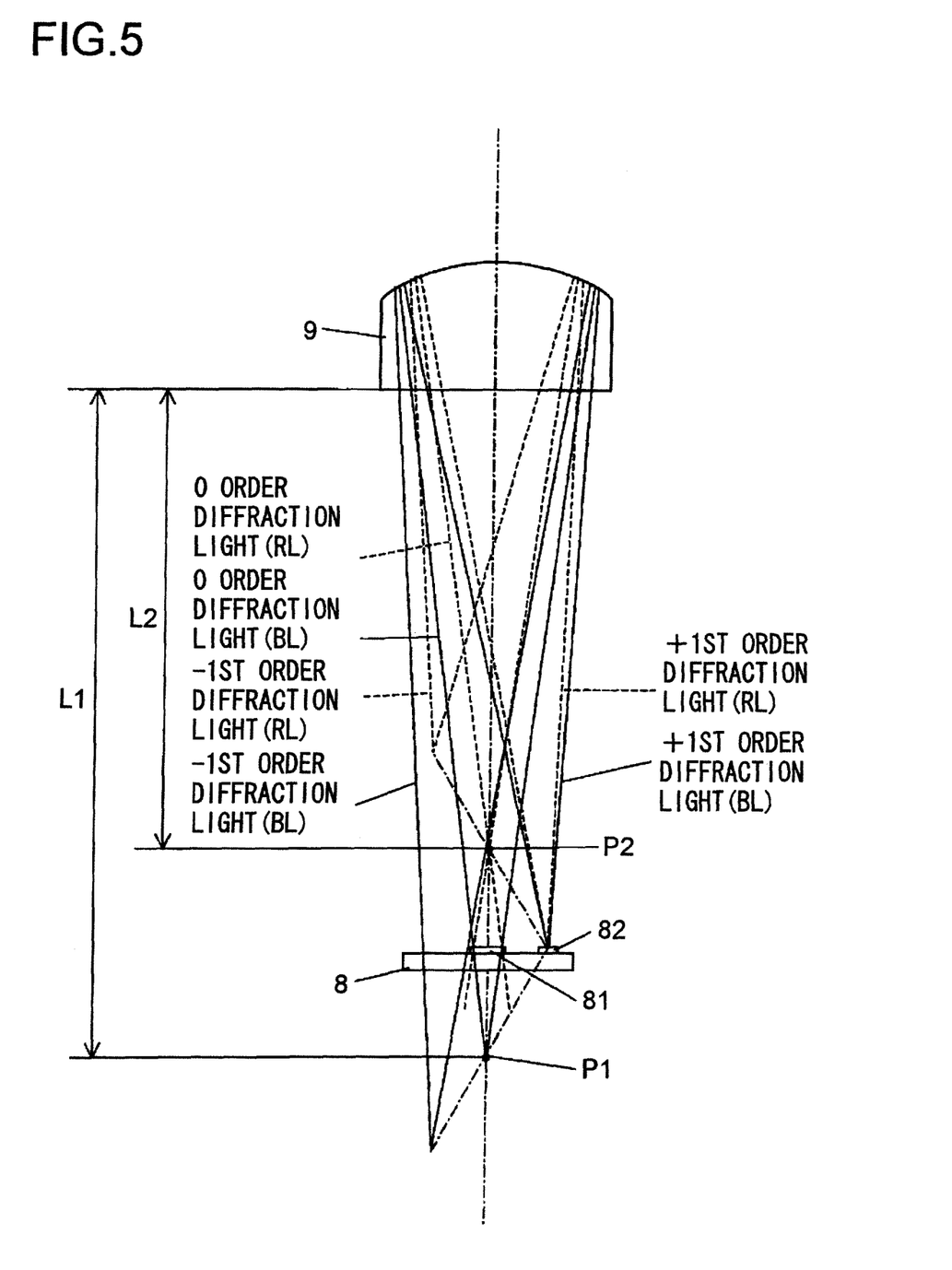
FIG. 5 shows a diagram of another example corresponding to FIG. 4.

For example, as shown in FIG. 5, it is possible to form the second hologram 72 so that the +1st order diffraction light of the red color laser beam RL is condensed farther than the −1st order diffraction light. Thus, +1st order diffraction light of the blue color laser beam BL can be condensed at the second photo detecting portion 82, and the +1st order diffraction light of the red color laser beam RL can also be condensed at the second photo detecting portion 82. As a result, the photo detector element 8 is not required to have the third photo detecting portion 83, and the photo detector element can be formed in a simple structure, so the flexibility in designing the optical head can be increased.

In the example described above, the hologram element 7 includes the first hologram 71 that is provided to the first surface 7a and can separate the blue color laser beam BL into the 0 order diffraction light and the ±1st order diffraction light and the second hologram 72 that is provided to the second surface 7b and can separate the red color laser beam RL into the 0 order diffraction light and the ±1st order diffraction light. However, the present invention is not limited to this structure. It is possible to arrange recess grooves for diffracting the blue color laser beam BL and recess grooves for diffracting the red color laser beam RL on one surface regularly. As the hologram element, one that can separate laser beams having different wavelengths into the 0 order diffraction light and the ±1st order diffraction light, independently and respectively.

In the example described above, the optical head A of the present invention includes the blue color laser beam sources 1 that emits the blue color laser beam BL for a BD and the red color laser beam sources 2 that emits the red color laser beam RL for a DVD. However, the present invention is not limited to this structure. The present invention can be applied widely to optical heads equipped with two laser beam sources of different wavelengths.

The optical head of the present invention can be applied to an optical disc device that uses optical discs including a CD, a DVD, a BD and the like as recording media.

What is claimed is:

1. An optical head, comprising:
   a first laser beam source for emitting a first laser beam that supports a first optical disc;
   a second laser beam sources for emitting a second laser beam that supports a second optical disc;
   an objective lens for condensing the first or the second laser beam on a recording surface of the first or the second optical disc;
   a diffraction optical element for permitting the first or the second laser beam reflected by the first optical disc or the second optical disc to pass through and for separating 0 order diffraction light and 1st order diffraction light independently;
   a detection lens for condensing the 0 order diffraction light of the first or the second laser beam on an optical axis and for condensing the 1st order diffraction light of the first or the second laser beam at a symmetric position with respect to the condensing point of the 0 order diffraction light of the first or the second laser beam; and
   a photo detector element including a first photo detecting portion for detecting the 0 order diffraction light of the first or the second laser beam that passed through the detection lens and two second photo detecting portions arranged symmetrically with respect to the first photo detecting portion for detecting the 1st order diffraction light of the first or the second laser beam, the first photo detecting portion and the two second photo detecting portions being arranged on the same plane, wherein the photo detector element is arranged so that the first photo detecting portion is located between the condensing point of the 0 order diffraction light of the first laser beam and the condensing point of the 0 order diffraction light of the second laser beam that is condensed at a position closer to the detection lens than the condensing point of the first laser beam and that the optical axis of the 0 order diffraction light becomes perpendicular to the first photo detecting portion, and the diffraction optical element changes a phase of a 1st order diffraction light of the first or the second laser beam so that a 1st order diffraction light that is condensed at a position closer to the detection lens of the first laser beam is condensed on one of the second photo detecting portions of the photo detector element and that a 1st order diffraction light that is condensed at a position farther from the detection lens of the second laser beam, is condensed on the other of the second photo detecting portions.

2. The optical head according to claim 1, wherein the diffraction optical element includes a first hologram formed on one surface for separating the first laser beam and a second hologram formed on the other surface for separating the second laser beam, and the first or the second hologram separates the first or the second laser beam independently.

3. The optical head according to claim 1, wherein the diffraction optical element includes the first hologram for separating the 0 order diffraction light and the 1st order diffraction light from the first laser beam and the second hologram for separating the 0 order diffraction light and the 1st order diffraction light from the second laser beam, the first and the second holograms being arranged on the surface in a regular manner, respectively.

4. An optical head, comprising:

a first laser beam source for emitting a first laser beam that has a shorter wavelength corresponding to a first optical disc having a smaller thickness of a disc substrate;

a second laser beam sources for emitting a second laser beam that has a longer wavelength corresponding to a second optical disc having a larger thickness of the disc substrate;

a collimator lens that converts the first laser beam into parallel rays and converts the second laser beam into light having a small angle of divergence;

an objective lens for condensing the first or the second laser beam on a recording surface of the first or the second optical disc;

a hologram element including a first hologram formed on one surface for separating the 0 order diffraction light and the ±1st order diffraction light from only the first laser beam reflected by the first optical disc and a second hologram formed on the other surface for separating the 0 order diffraction light and the ±1st order diffraction light from only the second laser beam reflected by the second optical disc;

a detection lens for condensing the 0 order diffraction light of the first or the second laser beam on an optical axis and for condensing the ±1st order diffraction light of the first or the second laser beam at a symmetric position with respect to the condensing point of the 0 order diffraction light of the first or the second laser beam and the optical axis of the 0 order diffraction light; and a photo detector element including a first photo detecting portion for detecting the 0 order diffraction light of the first or the second laser beam that passed through the detection lens and two second photo detecting portions arranged symmetrically with respect to the first photo detecting portion as a center for detecting the ±1st order diffraction light of the first or the second laser beam, the first photo detecting portion and the two second photo detecting portions being arranged on the same plane, wherein the photo detector element is arranged so that the first photo detecting portion is located between the condensing point of the 0 order diffraction light of the first laser beam and the condensing point of the 0 order diffraction light of the second laser beam that is condensed at a position closer to the detection lens than the condensing point of the first laser beam and that the optical axis of the 0 order diffraction light becomes perpendicular to the first photo detecting portion, and the first hologram of the hologram element changes a phase of the ±1st order diffraction light of the first laser beam so that a +1st order diffraction light that is condensed at a position closer to the detection lens is condensed on one of the second photo detecting portions of the photo detector element, and the second hologram changes a phase of the ±1st order diffraction light of the second laser beam so that a −1st order diffraction light that is condensed at a position farther from the detection lens of the second laser beam is condensed on the other of the second photo detecting portions of the photo detector element.

* * * * *